UNITED STATES PATENT OFFICE.

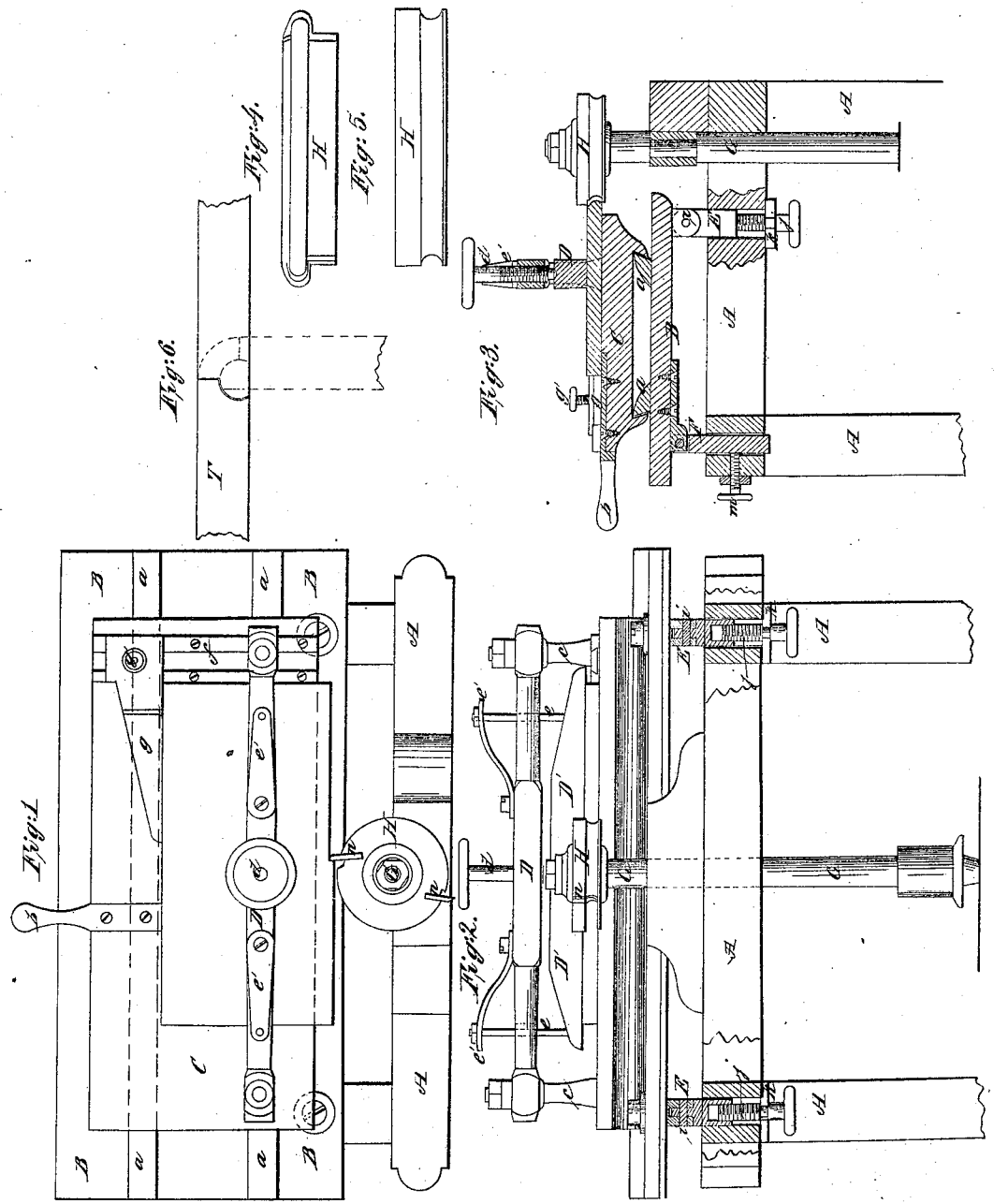

F. B. MARBLE, OF COLUMBUS, OHIO.

IMPROVEMENT IN MACHINES FOR JOINTING TOPS AND LEAVES OF TABLES.

Specification forming part of Letters Patent No. 53,018, dated March 6, 1866.

*To all whom it may concern:*

Be it known that I, F. B. MARBLE, of Columbus, in the county of Franklin and State of Ohio, have invented a new Machine for Jointing the Leaves and Tops of Tables; and I do hereby declare that the following is a full, clear, and exact description thereof, reference being had to the accompanying drawings, making a part of this specification, in which—

Figure 1 is a top view of the improved machine. Fig. 2 is a side elevation of the machine, with portions of the frame broken away to show the method of attaching the table to its frame. Fig. 3 is a vertical transverse section through the machine. Figs. 4 and 5 show the wheels which carry the cutters. Fig. 6 shows the form of the joint which the machine is intended to make.

The object of my invention is to provide for adjusting the table or bed upon which the work to be jointed is supported, so that this table can be elevated, or depressed, or inclined at any desired angle, for the purpose of more perfectly presenting the work to the cutters.

To enable others skilled in the art to understand my invention, I will describe its construction and operation.

In the accompanying drawings, A represents the frame of the machine, and B a table or bed, which is supported upon the horizontal top of this frame in such manner that it can be elevated, or depressed, or adjusted and set at any desired angle with respect to a horizontal plane. On top of this bed, and extending longitudinally across the same, are two parallel ways, $a\ a$, which are intended to serve as guides for a movable carriage, C, upon which the work to be jointed is secured. This carriage C is connected to the ways $a\ a$ in such manner that it will not lift up or get out of place, and so that it can be moved in a longitudinal direction backward or forward by hand, a handle, $b$, being provided for this purpose. Near the extremities of this carriage are two posts, $c\ c$, which serve as supports for a horizontal bar, D, which has a vertical adjusting-screw, $d$, tapped through it at the middle of its length. This screw acts upon a follower or clamping-head, D', which is arranged beneath the bar D and supported by means of rods $e\ e$, which pass up through the bar D and are connected to the extremities of springs $e'\ e'$, that are secured on top of this bar, as shown in Figs. 1 and 2.

The screw $d$ is used to force the follower D' down upon the work to hold it firmly upon the table or carriage C, and the springs are used to lift up the follower as the screw $d$ is loosened or retracted.

Near one end of the carriage C is a plate, $f$, which extends transversely across this carriage and is rigidly secured to it. This plate serves as a straight-edge for gaging the work upon the carriage, and it also serves to guide an adjustable gage, $g$, which abuts against and supports the back of the work. The gage $g$ has a dovetail tenon formed on one end, which works in a corresponding groove in plate $f$, so that by means of a set-screw, $g'$, the gage $g$ can be fixed in any desired position. One edge of the plate $f$ and one edge of the gage $g$ being at right angles to each other, if the stuff to be jointed be properly dressed it can be readily adjusted truly upon the carriage C, and then secured in place thereon by means of the screw $d$ and follower D', as above described.

The table B is mounted upon three adjustable supports, E, E, and F. The supports E E are hinged at $i\ i$, and receive in their lower ends adjusting-screws $j\ j$, which are kept in place by means of collar-plates $k\ k$, that are fixed to the bottom side of the longitudinal rail into which the lower portions of the hinged supports enter, as clearly shown in the drawings, Figs. 2 and 3. By turning the screws $j\ j$ that edge of the table B beneath which they are located can be elevated or depressed. The opposite side of table B is mounted upon a vertical slide, F, which is pivoted at its upper end to this table, at the middle of its length, and which can be fixed at any desired point by means of the set-screw $m$. (Shown in Fig. 3.) If desirable, set-screws may be applied on each side of the adjustable support F for steadying the table B and preventing it from trembling during the operation of jointing the stuff.

G represents a vertical spindle, which is supported in suitable bearings on one side of the frame A, and which carries upon its upper end a circular cutter-wheel or head, H, as shown in Figs. 1, 2, and 3. This head is provided on its periphery with cutters $n\ n$, adapted for giving the required form to the edge of the stuff, and these cutters are so arranged that they will operate to the best advantage upon the stuff.

By reference to Fig. 6 it will be seen that the table-top T has a groove formed in its edge, which is adapted to receive a bead that is formed on the edge of the table-leaf, so that when the leaf is hinged to the table-top a close joint will be formed and the leaf allowed to swing freely. Joints of this form which have hitherto been made are more or less imperfect, on account of the grooves in the edges of the table-top T not being made deep enough to allow the beads on the leaves to fit well into them. By inclining the stuff during the act of jointing it the cutters will work well under the edges.

By means of the adjustable table B provision is made for holding the stuff in the desired position and adjusting it up to the cutters instead of adjusting the cutters to the stuff.

It will be seen by reference to Figs. 4 and 5 that I employ at different times two forms of cutters, one of which is intended for cutting the grooves in the edges of the table-top, and the other for forming the beads on the edges of the table-leaves.

Having thus described my invention, what I claim as new, and desire to secure by Letters Patent, is—

1. In a machine which is capable of making the joints of table-leaves substantially as described, the combination and arrangement of the rotary cutter-head H, table B, carriage C, hinged supports E, E, and F, substantially as and for the purpose described.

2. The combination and arrangement of the clamp or follower, substantially as described, with the table B, carriage C, hinged supports E, E, and F, and rotary cutter-head H, all operating substantially as and for the purpose set forth.

F. B. MARBLE.

Witnesses:
PHILLIP AMOS,
E. M. DOWNS.